(12) United States Patent
Weng et al.

(10) Patent No.: US 9,575,603 B2
(45) Date of Patent: Feb. 21, 2017

(54) TOUCH DEVICE, TOUCH PANEL, AND METHOD FOR CONTROLLING THE SAME

(71) Applicant: CHUNGHWA PICTURE TUBES, LTD., Taoyuan (TW)

(72) Inventors: Ming-Chi Weng, Kinmen County (TW); Yun-Chih Chen, Taoyuan County (TW); Hung-Hsiang Chen, Taoyuan County (TW)

(73) Assignee: CHUNGHWA PICTURE TUBES, LTD., Taoyuan (TW)

( * ) Notice: Subject to any disclaimer, the term of this patent is extended or adjusted under 35 U.S.C. 154(b) by 482 days.

(21) Appl. No.: 14/022,217

(22) Filed: Sep. 9, 2013

(65) Prior Publication Data

US 2014/0327627 A1    Nov. 6, 2014

(30) Foreign Application Priority Data

May 1, 2013 (TW) .............................. 102115627 A

(51) Int. Cl.
*G06F 3/044* (2006.01)
(52) U.S. Cl.
CPC .................... *G06F 3/044* (2013.01)
(58) Field of Classification Search
CPC ........ G06F 3/044; G06F 3/041; H05K 1/0296; H05K 1/0274
See application file for complete search history.

(56) References Cited

U.S. PATENT DOCUMENTS

| 2008/0252608 | A1* | 10/2008 | Geaghan | G06F 3/044 345/173 |
| 2010/0194696 | A1* | 8/2010 | Chang | G06F 3/0412 345/173 |
| 2010/0289774 | A1* | 11/2010 | Pan | G06F 3/044 345/175 |
| 2011/0193791 | A1 | 8/2011 | Tong et al. | |
| 2011/0261009 | A1 | 10/2011 | Inagaki et al. | |
| 2012/0169628 | A1* | 7/2012 | Kuo | G06F 3/044 345/173 |

(Continued)

FOREIGN PATENT DOCUMENTS

| CN | 101887334 A | 11/2010 |
| CN | 102203698 A | 9/2011 |

(Continued)

*Primary Examiner* — Alexander Eisen
*Assistant Examiner* — Abhishek Sarma
(74) *Attorney, Agent, or Firm* — CKC & Partners Co., Ltd.

(57) ABSTRACT

A touch panel includes a substrate and a first electrode array. The first electrode array is disposed on the substrate and includes first and second touch regions. The first electrode array further includes first, second, third, and fourth electrodes. The first electrode is disposed on the first touch region. The second electrode is disposed on the first touch region corresponding in position to the first electrode. The third electrode is disposed on the second touch region. The fourth electrode is disposed on the second touch region corresponding in position to the third electrode. In addition, the first to fourth electrodes are all disposed on the same layer. The first electrode is disposed diagonally to the fourth electrode, and the first electrode is electrically coupled to the fourth electrode. Furthermore, a method for controlling the touch panel is also disclosed herein.

10 Claims, 3 Drawing Sheets

(56) References Cited

U.S. PATENT DOCUMENTS

2014/0009438 A1* 1/2014 Liu .......................... G06F 1/16
345/174

FOREIGN PATENT DOCUMENTS

| CN | 102314273 A | 1/2012 |
| CN | 102736804 A | 10/2012 |
| CN | 102830877 A | 12/2012 |
| JP | 2011150455 A | 8/2011 |
| JP | 2011238172 A | 11/2011 |
| TW | 201140409 A1 | 11/2011 |
| TW | M432884 U1 | 7/2012 |
| TW | M448018 U1 | 3/2013 |

* cited by examiner

TOUCH DEVICE, TOUCH PANEL, AND METHOD FOR CONTROLLING THE SAME

RELATED APPLICATIONS

This application claims priority to Taiwanese Application Serial Number 102115627, filed May 1, 2013, which is herein incorporated by reference.

BACKGROUND

Field of Invention

The present invention relates to a panel and a method for controlling the same and, more particularly, to a touch device, a touch panel, and a method for controlling the same.

Description of Related Art

A touch panels is a type of human-machine interface. Due to the intuitive operation of touch panels, the connection between humans and machines is made more convenient, and as a result, touch panels have been developed in a progressive manner in recent years.

A single side with multilayer structure is typically used in touch panels. However, due to the multilayer membrane structure, when the single side with multilayer structure is used in a display product, light transmittance is reduced.

In addition, a single side with single layer structure is used in display products. However, when a conventional single side with single layer structure is used to detect multi touch, actual finger touching positions cannot be detected effectively.

There has been much effort in trying to find a solution to the aforementioned problems. Nonetheless, there is still a need to improve the existing apparatuses and techniques in the art.

SUMMARY

One aspect of the present invention is related to a touch panel. The touch panel comprises a substrate and a first electrode array. The first electrode array is disposed on the substrate and comprises a first touch region and a second touch region. The first electrode array further comprises a first electrode, a second electrode, a third electrode, and a fourth electrode. With respect to structure, the first electrode is disposed in the first touch region. The second electrode is disposed in the first touch region, and the second electrode is disposed corresponding in position to the first electrode. The third electrode is disposed in the second touch region. The fourth electrode is disposed in the second touch region, and the fourth electrode is disposed corresponding in position to the third electrode. In addition, the first to fourth electrodes are all disposed on the same layer, the first electrode and the fourth electrode are disposed diagonally to each other, and the first electrode is electrically coupled to the fourth electrode.

In one embodiment of the present invention, each of the first, second, third, and fourth electrodes is trapezoidal in shape.

In another embodiment of the present invention, a longer one of an upper base and a lower base of the trapezoid of the first electrode and a shorter one of an upper base and a lower base of the trapezoid of the second electrode are disposed on the same side.

In yet another embodiment of the present invention, a longer one of an upper base and a lower base of the trapezoid of the third electrode and a shorter one of an upper base and a lower base of the trapezoid of the fourth electrode are disposed on the same side.

In still another embodiment of the present invention, the touch panel further comprises a second electrode array. The second electrode array is disposed on the substrate and comprises a third touch region and a fourth touch region. The second electrode array further comprises a fifth electrode, a sixth electrode, a seventh electrode, and an eighth electrode. The fifth electrode is disposed in the third touch region. The sixth electrode is disposed in the third touch region, and the sixth electrode is disposed corresponding in position to the fifth electrode. The seventh electrode is disposed in the fourth touch region. The eighth electrode is disposed in the fourth touch region, and the eighth electrode is disposed corresponding in position to the seventh electrode. The fifth electrode to the eighth electrode are all disposed on the same layer, the sixth electrode and the seventh electrode are disposed diagonally to each other, and the sixth electrode is electrically coupled to the seventh electrode.

Another aspect of the present invention is related to a touch device. The touch device comprises a processor, a substrate, and an electrode array. The electrode array is disposed on the substrate and comprises a first touch region and a second touch region. The electrode array further comprises a first electrode, a second electrode, a third electrode, and a fourth electrode. With respect to structure, the first electrode is disposed in the first touch region and electrically coupled to the processor through a first trace. The second electrode is disposed in the first touch region, the second electrode is disposed corresponding in position to the first electrode, and the second electrode is electrically coupled to the processor through a second trace. The third electrode is disposed in the second touch region and electrically coupled to the processor through a third trace. The fourth electrode is disposed in the second touch region, and the fourth electrode is disposed corresponding in position to the third electrode. The first to fourth electrodes are all disposed on the same layer, the first electrode and the fourth electrode are disposed diagonally to each other, and the first electrode is electrically coupled to the fourth electrode. With respect to operation, the processor scans the first electrode, the second electrode, and the third electrode in sequence; the second electrode and the third electrode are detected when the processor scans the first electrode; the first electrode and the fourth electrode are detected when the processor scans the second electrode; and the first electrode and the fourth electrode are detected when the processor scans the third electrode.

In another embodiment of the present invention, the second electrode detects a touch area generated by a touch event and outputs a touch signal to the processor according to the touch area correspondingly when the processor scans the first electrode and the touch event occurs in the first touch region.

In yet another embodiment of the present invention, the third electrode detects a touch area generated by a touch event and outputs a touch signal to the processor according to the touch area correspondingly when the processor scans the first electrode and the touch event occurs in the second touch region.

In still another embodiment of the present invention, each of the second electrode and the third electrode detects touch areas generated by touch events and output a touch signal to the processor according to the touch areas when the processor scans the first electrode and touch events occurs in the first touch region and the second touch region at the same time.

In another embodiment of the present invention, the first electrode detects a touch area generated by a touch event and outputs a touch signal to the processor according to the touch area correspondingly when the processor scans the second electrode and the touch event occurs in the first touch region.

In yet another embodiment of the present invention, the first electrode detects a touch area generated by a touch event through the fourth electrode and outputs a touch signal to the processor according to the touch area correspondingly when the processor scans the third electrode and the touch event occurs in the second touch region.

In still another embodiment of the present invention, each of the first, second, third and fourth electrodes is trapezoidal in shape.

In yet another embodiment of the present invention, a touch generated by a touch event is variable correspondingly when the touch event occurs along an upper base to a lower base of one of the trapezoids of the electrode, and one of the electrodes outputs a touch signal to the processor correspondingly according to the touch area.

In still another embodiment of the present invention, wherein when one of the electrodes is used as a signal electrode, another one of the electrodes is used as a detect electrode, and when one of the electrodes is used as the detect electrode, another one of the electrodes is used as the signal electrode.

Yet another aspect of the embodiment of the present invention is related to a method for controlling a touch panel, which applied in a touch panel. The method comprises the steps of:

scanning the first electrode, the second electrode, and the third electrode in sequence by a processor:

detecting the second electrode and the third electrode when scanning the first electrode by the processor;

detecting the first electrode and the fourth electrode when scanning the second electrode by the processor; and detecting the first electrode and the fourth electrode when scanning the third electrode by the processor.

As a result, according to the technique content of the present invention, the embodiments of the present invention provide a touch panel, a touch device, and method for controlling the same, which address the problem of manufacturing difficulty and decrease in light transmittance encountered with the use of the single side with multilayer structure, and also address the problem of inability to effectively detect actual finger touching positions when a conventional single side with single layer structure is used to detect multi touch.

BRIEF DESCRIPTION OF THE DRAWINGS

The invention can be more fully understood by reading the following detailed description of the embodiments, with reference made to the accompanying drawings as follows.

DETAILED DESCRIPTION

Figure 1:
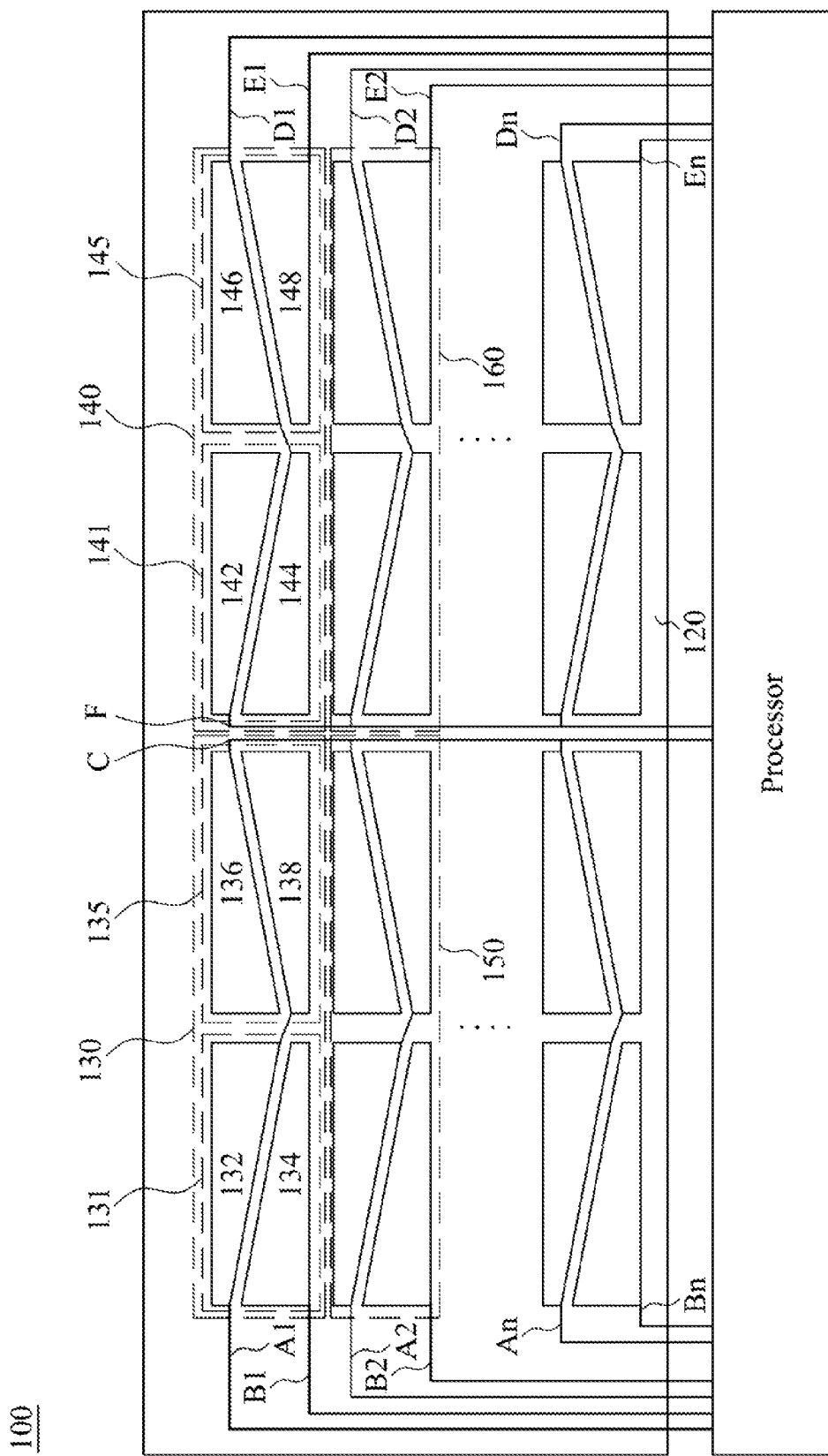
FIG. 1 schematically shows a diagram of a touch device according to embodiments of the present invention.

FIG. 1 schematically shows a diagram of a touch device 100 according to embodiments of the present invention. As shown in FIG. 1, a touch device 100 includes a processor 110, a substrate 120, and an electrode array (for example, a first electrode array 130, a second electrode array 140, etc.), in which the electrode array is disposed on the substrate 120. It is noted that the touch panel is the part which does not include the processor 110 in the touch device 100.

Since the electrode array is used as a basic sensing unit in the present invention, the single electrode array structure and the sensing method thereof will first be introduced such that the touch device 100 of the present invention is easier to understand.

Figure 2:
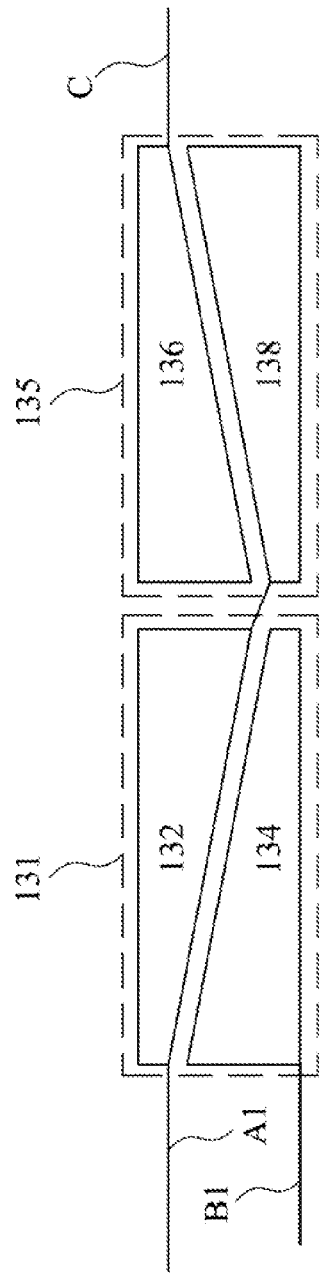
FIG. 2 schematically shows a diagram of an electrode array of FIG. 1 according to embodiments of the present invention.

First, the basic structure of the electrode array is introduced. FIG. 2 schematically shows a diagram of an electrode array of FIG. 1 according to embodiments of the present invention. The first electrode array 130 as shown in FIG. 1 is used as an example. The first electrode array 130 is disposed on the substrate 120 (not shown) and can be divided into a first touch region 131 and a second touch region 135. In addition, the first electrode array 130 includes a first electrode 132, a second electrode 134, a third electrode 136, and a fourth electrode 138. With respect to structure, both the first electrode 132 and the second electrode 134 are disposed in the first touch region 131, and the second electrode 134 is disposed corresponding in position to the first electrode 132. The third electrode 136 and fourth electrode 138 are both disposed in the second touch region 135, and the fourth electrode 138 is disposed corresponding in position to the third electrode 136.

Furthermore, due to the first electrode 132, the second electrode 134, the third electrode 136, and the fourth electrode 138 being all disposed on the same layer, compared with the single side with multilayer membrane structure, the light transmittance of the present invention is better. In addition, as can be seen in FIG. 2, the first electrode 132 and the fourth electrode 138 are disposed diagonally to each other, and the first electrode 132 is electrically coupled to the fourth electrode 138.

In one embodiment, each of the first electrode 132, the second electrode 134, the third electrode 136, and the fourth electrode 138 can be trapezoidal in shape. Hence, the problem of accuracy in detection being reduced can be avoided. That is, if the foregoing electrodes were triangular in shape, the area of the tips of the triangles would be too small, so that the contact areas would be insufficient when touch events occur at the tips of the triangles, leading to detection inaccuracy.

In one embodiment, as shown in FIG. 2, a longer one of an upper base and a lower base of the trapezoid of the first electrode 132 (for example, the right side of the first electrode 132) and a shorter one of an upper base and a lower base of the trapezoid of the second electrode 134 (for example, the right side of the second electrode 134) are disposed on the same side. Correspondingly, a shorter one of an upper base and a lower base of the trapezoid of the first electrode 132 (for example, the left side of the first electrode 132) and a longer one of an upper base and a lower base of the trapezoid of the second electrode 134 (for example, the left side of the second electrode 134) are disposed on the same side.

In another embodiment, a longer one of an upper base and a lower base of the trapezoid of the third electrode 136 (for example, the left side of the third electrode 136) and a shorter one of an upper base and a lower base of the trapezoid of the fourth electrode 138 (for example, the left side of the fourth electrode 138) are disposed on the same side. Correspondingly, a shorter one of an upper base and a lower base of the trapezoid of the third electrode 136 (for example, the right side of the third electrode 136) and a longer one of an upper base and a lower base of the trapezoid of the fourth electrode 138 (for example, the right side of the fourth electrode 138) are disposed on the same side.

In one embodiment, referring to FIG. 1, the touch panel includes the first electrode array 130 and the second electrode array 140. The second electrode array 140 is disposed on the substrate 120, and can be divided into a third touch region 141 and a fourth touch region 145. In addition, the second electrode array 140 includes a fifth electrode 142, a sixth electrode 144, a seventh electrode 146, and an eighth electrode 148. With respect to structure, both the fifth electrode 142 and sixth electrode 144 are disposed in the third touch region 141, and the sixth electrode 144 is disposed corresponding in position to the fifth electrode 142. The seventh electrode 146 and the eighth electrode 148 are both disposed in the fourth touch region 145, and the eighth electrode 148 is disposed corresponding in position to the seventh electrode 146.

As a result, the touch panel includes the first electrode array 130 and the second electrode array 140, that is to say, the touch panel includes a plurality of sensing units, and each of the sensing units includes at least four electrodes. When performing multi touch, the touch panel structure of the present invention can differentiate positions generated by multi touch operations effectively, which addresses the problem of an inability to effectively detect actual finger touching positions when a conventional single side with single layer structure is used to detect multi touch.

In addition, the first electrode 132, the second electrode 134, the third electrode 136, the fourth electrode 138, the fifth electrode 142, the sixth electrode 144, the seventh electrode 146, and the eighth electrode 148 are all disposed on the same layer. In addition, as can be seen in FIG. 1, the sixth electrode 144 and the seventh electrode 146 are disposed diagonally to each other, and the sixth electrode 144 is electrically coupled to the seventh electrode 146.

The sensing method of the electrode array will now be introduced. With reference to FIG. 1, the first electrode 132 is electrically coupled to the processor 110 through a first trace $A_1$, the second electrode 134 is electrically coupled to the processor 110 through a second trace $B_1$, and the third electrode 136 is electrically coupled to the processor 110 through a third trace C. Due to the fourth electrode 138 being electrically coupled to the first electrode 132, the fourth electrode 138 is electrically coupled to the processor 110 through the first electrode 132 and the first trace $A_1$.

In addition, as can be seen in FIG. 1, the touch device 100 further includes a third electrode array 150, and the disposition of the electrodes thereof is similar to that of the first electrode array 130. The third electrode array 150 is electrically coupled to the processor 110 through traces $A_2$, $B_2$, and C. The number of the electrode arrays of the foregoing touch device 100 can be determined depending on actual requirements. As shown in FIG. 1, the touch device 100 can include N electrode arrays each of which is similar to the first electrode array 130, and the N electrode arrays can be electrically coupled to the processor 110 through the traces $A_1$~$A_N$, $B_2$~$B_N$, and C.

Furthermore, as can be seen in FIG. 1, the touch device 100 further includes a fourth electrode array 160, and the disposition of the electrodes thereof is similar to that of the first electrode array 140. The number of the electrode arrays of the foregoing touch device 100 can be determined depending on actual requirements. As shown in FIG. 1, the touch device 100 can include N electrode arrays each of which is similar to the second electrode array 140, and the N electrode arrays can be electrically coupled to the processor 110 through the traces $D_1$~$D_N$, $E_2$~$E_N$, and F.

In addition, as can be seen in FIG. 1, in the first electrode array 130, the first electrode 132 is electrically coupled to the fourth electrode 138. In the second electrode array 140, the sixth electrode 142 is electrically coupled to the seventh electrode 146 symmetrically. Because the traces in the panel cannot exceed a predetermined value, the electrodes in the first electrode array 130 and the second electrode array 140 are disposed symmetrically. With such disposition, the third electrodes of the first electrode array 130 and the third electrode array 150 can be electrically coupled to the processor 110 through a single trace C. In addition, the fifth electrodes of the second electrode array 140 and the fourth electrode array 160 can be electrically coupled to the processor 110 through a single trace F.

With respect to operation, the processor 110 scans the first electrode 132, the second electrode 134, and the third electrode 136 in sequence through the first trace $A_1$, the second trace $B_1$, and the third trace C. The second electrode 134 and the third electrode 136 are detected when the processor 110 scans the first electrode 132. The first electrode 132 and the fourth electrode 138 are detected when the processor 110 scans the second electrode 134. The first electrode 132 and the fourth electrode 138 are detected when the processor 110 scans the third electrode 136. By the use of the processor 110 scanning sequentially and detecting through the electrodes correspondingly, the touch device 100 can detect a touch event generated by the touch of a single finger or multiple fingers and obtain the position generated by the touch event. The sensing condition of the touch event generated by the touch of a single finger or multiple fingers will be described in detailed as below.

The second electrode 134 detects a touch area generated by a touch event and outputs a touch signal to the processor 110 according to the touch area correspondingly when the processor 110 scans the first electrode 132 and the touch event occurs in the first touch region 131. Hence, the processor 110 can calculate the position where the touch event occurs according to the touch signal.

The third electrode 136 detects a touch area generated by a touch event and outputs a touch signal to the processor 110 according to the touch area correspondingly when the processor 110 scans the first electrode 132 and the touch event occurs in the second touch region 135. Hence, the processor 110 can calculate the position where the touch event happens according to the touch signal.

Each of the second electrode 134 and the third electrode 136 detects touch areas generated by touch events and outputs a touch signal to the processor 110 according to the touch areas when the processor 110 scans the first electrode 132 and the touch events occur in the first touch region 131 and the second touch region 135 at the same time. Hence, the processor 110 can calculate the position where the touch event occurs according to the touch signal.

The first electrode 132 detects a touch area generated by a touch event and outputs a touch signal to the processor 110 according to the touch area correspondingly when the processor 110 scans the second electrode 134 and the touch event occurs in the first touch region 131. Hence, the processor 110 can calculate the position where the touch event occurs according to the touch signal.

The first electrode 132 detects a touch area generated by a touch event through the fourth electrode 138 and outputs a touch signal to the processor 110 according to the touch area correspondingly when the processor 110 scans the third electrode 136 and the touch event occurs in the second touch region 135. Hence, the processor 110 can calculate the position where the touch event occurs cording to the touch signal.

As can be known from the above-mentioned results, regardless of whether touch events are generated by touches of a single finger or multiple fingers on the touch device 100, the touch device 100 can detect the touch events to obtain positions where the touch events occur.

In one embodiment, when the processor 110 receives touch signals from the foregoing electrodes, the processor 110 is in a detection mode for calculating the position where the touch events occur. The processor 110 is in a scanning mode when the processor 110 does not receive touch signals from said electrodes. Hence, power can be saved.

In addition, with reference to FIG. 2, the length L and width W of the first to the eighth electrodes 132~148 are all not greater than 0.5 cm, and therefore, the length L and width W of the first to the fourth touch regions 131, 135, 141, 148 are also not greater than 0.5 cm such that the condition of two fingers touching the same touch region can be avoided and the accuracy of the touch device 100 can be increased.

Figure 3:
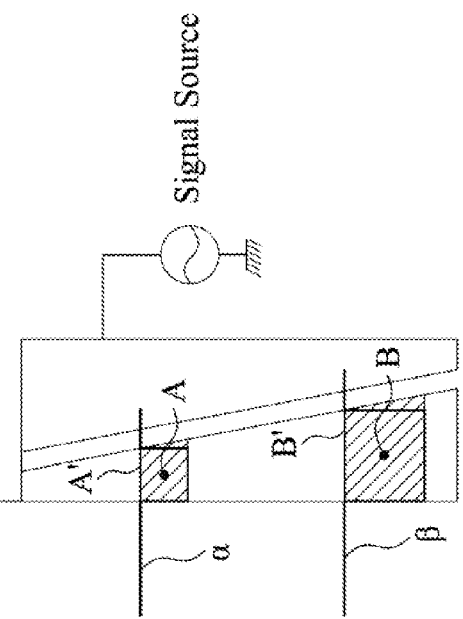
FIG. 3 schematically shows a diagram of an electrode array of FIG. 1 according embodiments of the present invention.

In one embodiment, when a touch event occurs along an upper base to a lower base of the trapezoid of one of the electrodes, a touch area generated by a touch event is variable correspondingly and the capacity of said electrode is variable correspondingly. One of the electrodes outputs a touch signal to the processor 110 correspondingly according to the touch area and the processor 110 can perform a calculation to obtain the position where the touch event occurs according to the variation of the touch signal. For example, referring to FIG. 3, which schematically shows a diagram of an electrode array of FIG. 1 according to embodiments of the present invention, the touch area is A' when the touch event occurs at point A of the electrode. The electrode outputs a touch signal α to the processor 110 according to the touch area A' correspondingly. The processor 110 can perform a calculation to obtain the position A where the touch event occurs according to the touch signal α. In addition, the touch area is B' when the touch event occurs at point B of the electrode. The electrode outputs a touch signal β to the processor 110 according to the touch area B' correspondingly, and the processor 110 can perform a calculation to obtain the position B where the touch event occurs according to the touch signal β.

In one embodiment, when one of the electrodes (for example, the first electrode 132) is used as a signal electrode, another one of the electrodes (for example, the second electrode 134) is used as a detect electrode. When one of the electrodes (for example, the first electrode 132) is used as a detect electrode, another one of the electrodes (for example, the second electrode 134) is used as a signal electrode. That is to say, the signal source and the detecting point of the touch device 100 can be exchanged. Through the exchanging of the signal source and the detecting point, touch events can be detected repeatedly, and the precision with which the touch device 100 detects the positions where the touch events occur can be ensured.

Figure 4:
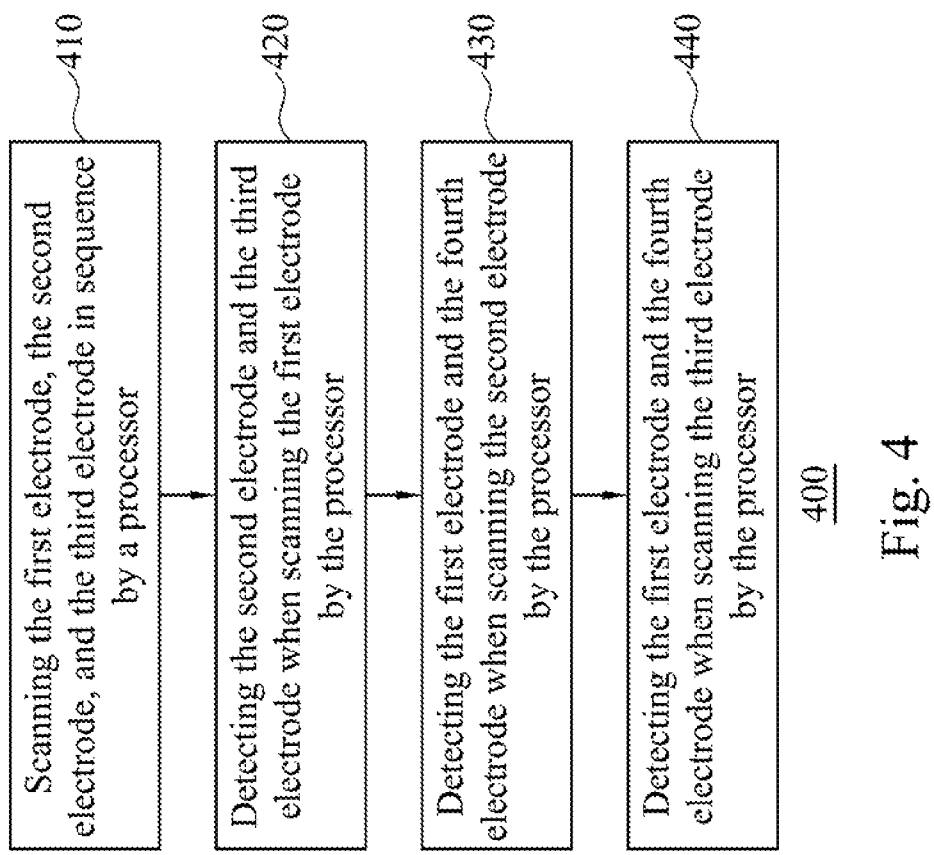
FIG. 4 schematically shows a flow diagram of a method for controlling a touch panel according to embodiments of the present invention.

FIG. 4 schematically shows a flow diagram of a method 400 for controlling a touch panel according to embodiments of the present invention. The method 400 for controlling the touch panel is applied to the above-mentioned touch panel. The method 400 for controlling the touch panel includes the steps of:

step 410: scanning the first electrode, the second electrode, and the third electrode in sequence by a processor;

step 420: detecting the second electrode and the third electrode when scanning the first electrode by the processor;

step 430: detecting the first electrode and the fourth electrode when scanning the second electrode by the processor; and step 440: detecting the first electrode and the fourth electrode when scanning the third electrode by the processor.

For making understanding the method 400 for controlling the touch panel easier, reference is made to both FIGS. 1 and 4. In step 410, the processor 110 is used to scan the first electrode 132, the second electrode 134, and the third electrode 136 in sequence. Subsequently, in step 420, the second electrode 134 and the third electrode 136 are detected when the processor 110 is used to scan the first electrode 132.

Similarly, in step 430, the first electrode 132 and the fourth electrode 138 are detected when the processor 110 is used to scan the second electrode 134. In step 440, the first electrode 132 and the fourth electrode 138 are detected when the processor 110 is used to scan the third electrode 136.

Because the method 400 for controlling the touch panel can scan sequentially and detect through the electrodes correspondingly by the processor 110, the touch device 100 can detect a touch event generated by the touch of a single finger or multiple fingers and obtain the position generated by the touch event.

In view of the foregoing embodiments of the present invention, many advantages of the present invention are now apparent. The embodiments of the present invention provide a touch device, a touch panel, and a method for controlling the same, which address the problem of manufacturing difficulty and decrease in light transmittance encountered with the use of single side with multilayer structure, and also address the problem of inability to effectively detect actual finger touching positions when a conventional single side with single layer structure is used to detect multi touch.

In addition, the electrodes of the touch panel can be trapezoidal in shape. Hence, the problem of accuracy in detection being reduced can be avoided. That is, if the foregoing electrodes were triangular in shape, the area of the tips of the triangles would be too small, so that the contact areas would be insufficient when touch events occur at the tips of the triangles, leading to detection inaccuracy. In addition, the length and width of the electrodes of the touch panel are all not greater than 0.5 cm such that the condition of two fingers touching the same touch region can be avoided and the accuracy of the touch device 100 can be increased.

Furthermore, through the exchanging of the signal source and the detecting point, touch events can be detected repeatedly, and the precision with which the touch device detects the positions where the touch events occur n be ensured.

What is claimed is:
1. A touch device comprising:
a processor;
a substrate;

an electrode array disposed on the substrate, the electrode array comprising a first touch region and a second touch region and further comprising:
- a first electrode disposed in the first touch region and electrically coupled to the processor through a first trace;
- a second electrode disposed in the first touch region, wherein the second electrode is disposed corresponding in position to the first electrode, and the second electrode is electrically coupled to the processor through a second trace;
- a third electrode disposed in the second touch region and electrically coupled to the processor through a third trace; and
- a fourth electrode disposed in the second touch region, wherein the fourth electrode is disposed corresponding in position to the third electrode;
- wherein the first to fourth electrodes are all disposed on the same layer, the first electrode and the fourth electrode are disposed diagonally to each other, and the first electrode is electrically coupled to the fourth electrode;
- wherein each of the first, second, third, and fourth electrodes is trapezoidal in shape;
- wherein a longer one of an upper base and a lower base of the trapezoid of the first electrode and a shorter one of an upper base and a lower base of the trapezoid of the second electrode are disposed on the same side;
- wherein the processor scans the first electrode, the second electrode, and the third electrode in sequence; the second electrode and the third electrode are detected when the processor scans the first electrode; the first electrode and the fourth electrode are detected when the processor scans the second electrode; and the first electrode and the fourth electrode are detected when the processor scans the third electrode.

2. The touch device according to claim 1, wherein the second electrode detects a touch area generated by a touch event and outputs a touch signal to the processor according to the touch area correspondingly when the processor scans the first electrode and the touch event occurs in the first touch region.

3. The touch device according to claim 1, wherein the third electrode detects a touch area generated by a touch event and outputs a touch signal to the processor according to the touch area correspondingly when the processor scans the first electrode and the touch event occurs in the second touch region.

4. The touch device according to claim 1, wherein each of the second electrode and the third electrode detects touch areas generated by touch events and outputs a touch signal to the processor according to the touch areas when the processor scans the first electrode and touch events occur in the first touch region and the second touch region at the same time.

5. The touch device according to claim 1, wherein the first electrode detects a touch area generated by a touch event and outputs a touch signal to the processor according to the touch area correspondingly when the processor scans the second electrode and the touch event occurs in the first touch region.

6. The touch device according to claim 1, wherein the first electrode detects a touch area generated by a touch event through the fourth electrode and outputs a touch signal to the processor according to the touch area correspondingly when the processor scans the third electrode and the touch event occurs in the second touch region.

7. The touch device according to claim 1, wherein each of the first, second, third and fourth electrodes is trapezoidal in shape.

8. The touch device according to claim 7, wherein a touch area generated by a touch event is variable correspondingly when the touch event occurs along an upper base to a lower base of one of the trapezoids of the electrode, and one of the electrodes outputs a touch signal to the processor correspondingly according to the touch area.

9. The touch device according to claim 1, wherein when one of the electrodes is used as a signal electrode, another one of the electrodes is used as a detect electrode, and when one of the electrodes is used as the detect electrode, another one of the electrodes is used as the signal electrode.

10. A method for controlling a touch panel, wherein the touch panel comprising a substrate and a first electrode array disposed on the substrate, the first electrode array comprising a first touch region and a second touch region and further comprising a first electrode disposed in the first touch region, a second electrode disposed in the first touch region, wherein the second electrode is disposed corresponding in position to the first electrode, a third electrode disposed in the second touch region and a fourth electrode disposed in the second touch region, wherein the fourth electrode is disposed corresponding in position to the third electrode, wherein the first to fourth electrodes are all disposed on the same layer, the first electrode and the fourth electrode are disposed diagonally to each other, and the first electrode is electrically coupled to the fourth electrode, wherein each of the first, second, third, and fourth electrodes is trapezoidal in shape, wherein a longer one of an upper base and a lower base of the trapezoid of the first electrode and a shorter one of an upper base and a lower base of the trapezoid of the second electrode are disposed on the same side, the method for controlling the touch panel comprising:
- scanning the first electrode, the second electrode, and the third electrode in sequence by a processor;
- detecting the second electrode and the third electrode when scanning the first electrode by the processor;
- detecting the first electrode and the fourth electrode when scanning the second electrode by the processor; and
- detecting the first electrode and the fourth electrode when scanning the third electrode by the processor.

* * * * *